United States Patent
Wang et al.

(10) Patent No.: US 7,426,404 B2
(45) Date of Patent: Sep. 16, 2008

(54) METHOD AND SYSTEM FOR CONSOLIDATING POWER SAVING CLASSES

(75) Inventors: Huai Y. Wang, Coconut Creek, FL (US); Floyd D. Simpson, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/693,800

(22) Filed: Mar. 30, 2007

(65) Prior Publication Data

US 2008/0070642 A1  Mar. 20, 2008

Related U.S. Application Data

(60) Provisional application No. 60/845,477, filed on Sep. 18, 2006.

(51) Int. Cl.
  *H04B 1/38* (2006.01)
  *H04M 1/00* (2006.01)
(52) U.S. Cl. .................................. 455/574; 455/343.1
(58) Field of Classification Search ............ 455/550.1, 455/552.1, 574, 343.1, 343.2, 343.4, 418–420; 370/311, 338
See application file for complete search history.

(56) References Cited

U.S. PATENT DOCUMENTS 6,973,052 B2    12/2005  Wang et al.
2006/0281436 A1*  12/2006  Kim et al. ................. 455/343.2
2007/0274247 A1*  11/2007  Chou ......................... 370/315

* cited by examiner

*Primary Examiner*—Nguyen Vo
(74) *Attorney, Agent, or Firm*—Larry G. Brown

(57) ABSTRACT

The invention concerns a method (200) and system (100) for consolidating PSCs. In particular, in a mixed media environment having a plurality of application connections associated with different PSCs, the method can include the steps of identifying (210) a primary application connection, defining (210) a consolidated PSC based on a demand property of the primary application connection and consolidating (212) at least some of the remaining application connections with the consolidated PSC. As such, the consolidated PSC may be associated with multiple application connections. The method can also include the steps of deactivating (218) the consolidated PSC when a deactivation indicator is received and reactivating (224) the consolidated PSC when a reactivation indicator is received.

11 Claims, 3 Drawing Sheets

200

| 210 | In a mixed media environment having a plurality of application connections associated with different PSCs, identify a primary application connection and define a consolidated PSC based on a demand property of the primary application connection |

| 212 | Consolidate at least some of the PSCs of the remaining application connections with the first PSC such that the first PSC is associated with multiple application connections |

| 214 | Receive from an MS a deactivation notice |

| 216 | Transmit traffic to the MS |

| 218 | Deactivate the consolidated PSC when a deactivation indicator is received |

| 220 | Embed in the transmitted traffic a reactivation indicator that, when received by the MS, will cause the MS to reactivate the consolidated PSC |

| 222 | Receive the reactivation indicator that prompts the reactivation of the consolidated PSC |

| 224 | Reactivate the consolidated PSC |

US 7,426,404 B2

METHOD AND SYSTEM FOR CONSOLIDATING POWER SAVING CLASSES

CROSS-REFERENCE TO RELATED APPLICATION

The present application claims the benefit of U.S. Provisional Application Ser. No. 60/845,477, filed Sep. 18, 2006, which is hereby incorporated by reference thereto.

BACKGROUND OF THE INVENTION

1. Field of the Invention

The present invention concerns power saving classes in a wireless network and more particularly, controlling such power saving classes to improve performance of mobile stations.

2. Description of the Related Art

Sleep mode is a state in which a mobile station (MS) conducts pre-negotiated periods of absence from a serving base station (BS) air interface. The Institute of Electrical and Electronics Engineers (IEEE) standard 802.16e defines sleep mode with the intent to minimize MS power use and to decrease the use of serving BS air interface resources. In particular, in the specification of the 802.16e standard, sleep mode operation is implemented in the form of power saving classes (PSC). Each PSC is a group of connections that have common demand properties. Typically, different PSCs will exist for real-time connections—such as voice over Internet protocol (VoIP) or push-to-talk (PTT) communications—and for non-real-time connections—like file transfer protocol (FTP). Moreover, there may even be different PSCs for the real-time connections, depending on the interval between consequent allocations for these connections. As such, an MS may have multiple PSCs in effect at the same time when the MS is simultaneously running a mix of real-time and non-real-time applications.

Because each PSC operates independently on its own sleep/awake schedule, it is only possible for an MS to turn off its transceiver and enter a sleep state when all the PSCs are in a sleep interval. Thus, the opportunities for the transceiver to enter a sleep state are decreased, particularly as the number of PSCs is increased. As a result, the MS suffers from increased power drain and shortened battery life.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
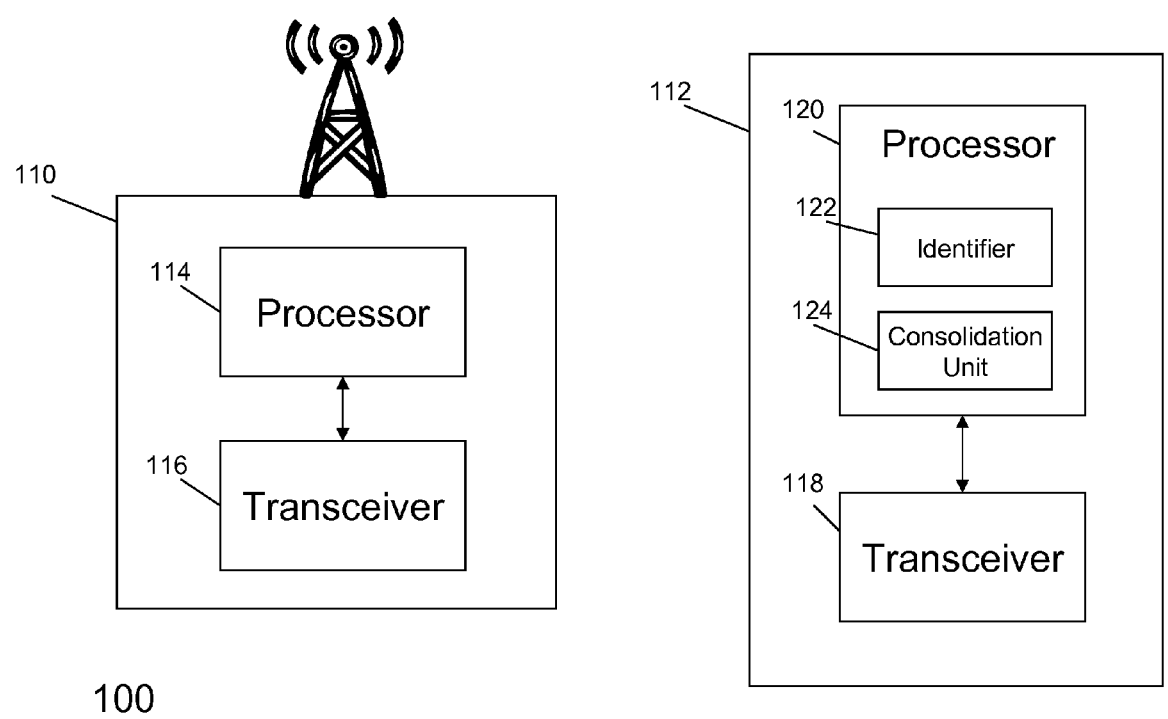
FIG. 1 illustrates a system for consolidating PSCs in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" can include any component or group of components, including any relevant hardware and/or software, that can carry out the functions described in relation to the inventive arrangements herein.

The term "communication unit" or "mobile unit" or "mobile station" can be defined as any electronic device capable of at least receiving and/or transmitting wireless communication signals. The term "transceiver" can be any component or group of components that are capable of receiving and transmitting communications signals. The term "consolidate" or "consolidating" can mean to bring separate parts together into a single or unified whole. A "mixed media environment" can include any setting or surrounding in which at least two types of media are supported. An "application connection" can be defined as a logical bearer carrying signaling and traffic for an application. An "application" can be defined as any program that is supported by a mobile station. A "power saving class" can be defined as a group of application connections that have common demand properties and that substantially share the same duration and frequency of listening intervals. Also, the term "deactivate" or "deactivating" can mean to disable, shut off or suspend. The term "reactivate" can mean to reinitiate, restart or resume. A "demand property" can be defined as one or more specifications required for a particular application.

The invention concerns a method and system for consolidating PSCs. In particular, in a mixed media environment having a plurality of application connections associated with different PSCs, the method can include the steps of identifying a primary application connection and defining a consolidated PSC based on a demand property of the primary application connection. The method can also include the step of consolidating at least some of the remaining application connections with the consolidated PSC. As such, the consolidated PSC may be associated with multiple application connections. These multiple application connections may have diverse demand properties. The method can also include the steps of deactivating the consolidated PSC when a deactivation indicator is received and reactivating the consolidated PSC when a reactivation indicator is received.

In this arrangement, a transceiver of a mobile station can be afforded more opportunities to enter a sleep state, because multiple application connections have been aggregated into a single class. Nevertheless, the mobile station still has the capability of dealing with large traffic bursts, particularly where non-real-time applications are concerned, in view of the consolidated PSC being deactivated. Moreover, the mobile station can quickly reactivate the consolidated PSC through the use of the reactivation indicator, which increases the chances that the transceiver can stay in the sleep state.

Referring to FIG. 1, a system 100 for consolidating PSCs is shown. The system 100 can include one or more base stations (BS) 110 and one or more MSs 112. The BS 110 can include a processor 114 and a transceiver 116 for communicating with the MSs 112. In addition, the MS 112 can include a transceiver 118 and a processor 120, which can include an identifier 122 and a consolidation unit 124. Although shown here as internal components of the processor 120, the identifier 122 and the consolidation unit 124 can be units that are separate from the processor 120. Moreover, the identifier 122 and the consolidation unit 124 may contain any suitable combination of software and/or circuitry for executing processes that will be described below.

The BS 110 can wirelessly exchange signals with any suitable number of the MSs 112. As an example, the communication protocol used for this communication can be IEEE standard 802.16e (commonly referred to as WiMax, or worldwide interoperability for microwave access), although it is understood that the invention is in no way limited as such.

In one arrangement, the MS 112 is capable of maintaining several application connections with the BS 110. For example, the MS 112 may support various applications, some of which may be real-time applications and some of which may be non-real-time applications. An example of a real-time application may be a push-to-talk or VoIP application, while an example of a non-real-time application includes file transfer protocol (FTP). Because it supports multiple applications, the MS 112 may maintain several application connections simultaneously.

Figure 2:
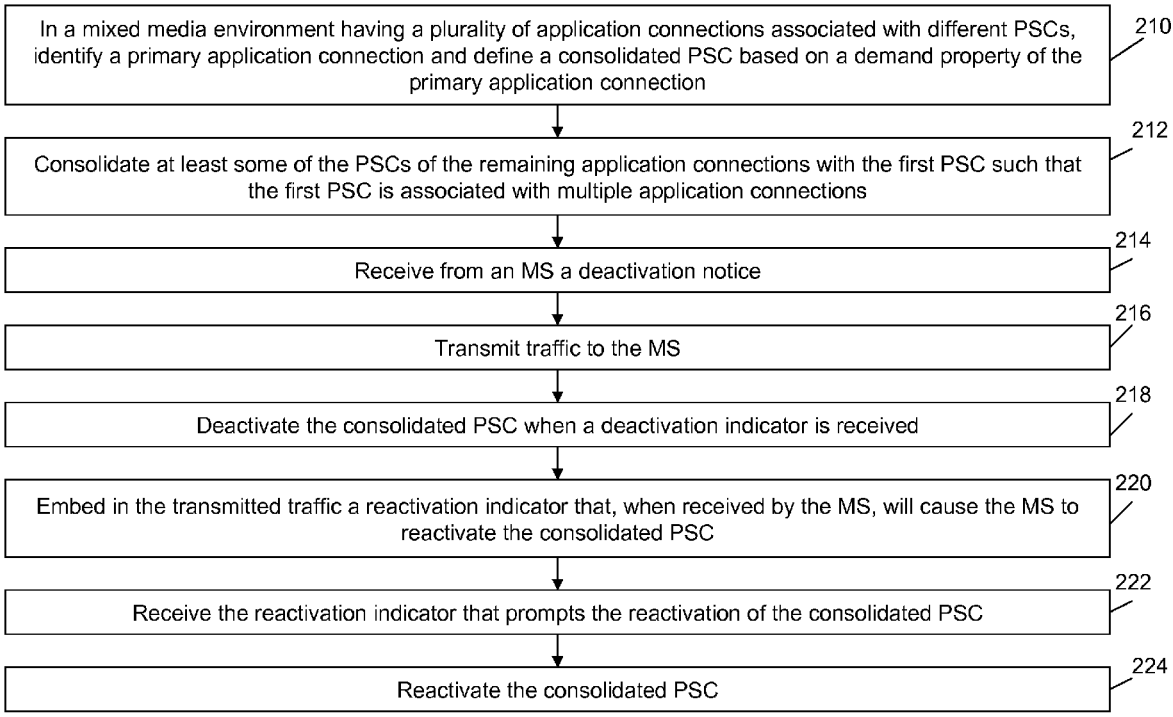
FIG. 2 illustrates a method for consolidating PSCs in accordance with an embodiment of the inventive arrangements.
Figure 3:
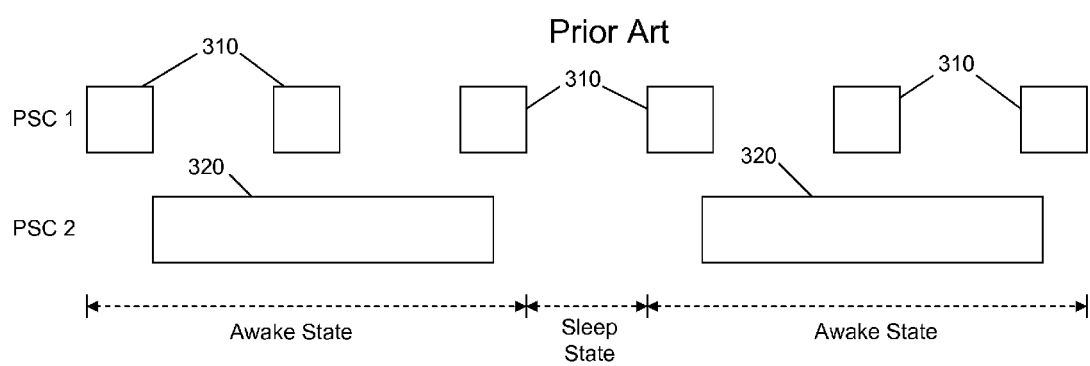
FIG. 3 shows several prior art PSCs.
Figure 4:
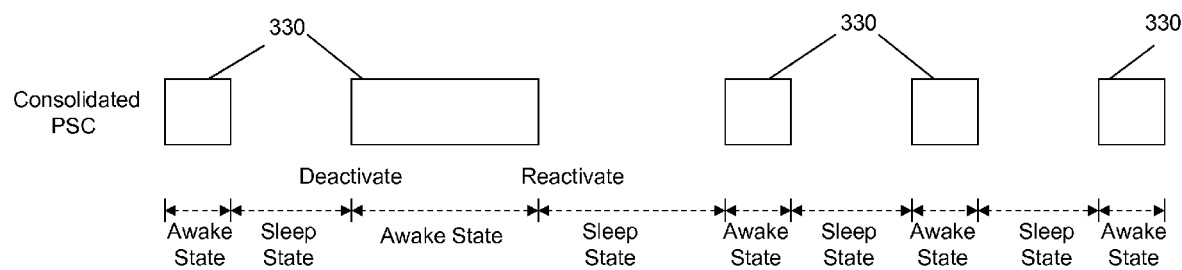
FIG. 4 shows a consolidated PSC in accordance with an embodiment of the inventive arrangements.

Referring to FIG. 2, a method 200 for consolidating PSCs is shown. When describing the method 200, reference will be primarily made to FIG. 1, although it is understood that the method 200 can be practiced in any other suitable system or device. Reference may also be made to FIGS. 3 and 4, which show several PSCs. The steps of the method 200 are not limited to the particular order in which they are presented in FIG. 2. The inventive method can also have a greater number of steps or a fewer number of steps than those shown in FIG. 2.

At step 210, in a mixed media environment having a plurality of application connections associated with different PSCs, a primary application connection can be identified and a consolidated PSC can be defined based on a demand property of the primary application connection. At step 212, at least some of the remaining application connections can be consolidated with the consolidated PSC such that the consolidated PSC is associated with multiple application connections.

For example, referring to FIG. 1, the MS 112, as noted earlier, may support a plurality of applications, such as VoIP, FTP, etc. In view of this multi-media capability, there may be times where the MS 112 is simultaneously supporting multiple applications. Referring to FIG. 3, several prior art PSCs are shown. Here, a first PSC (PSC 1) may include a plurality of listening intervals 310, and a second PSC (PSC2) may contain multiple listening intervals 320. As an example, the PSC 1 may be associated with a real-time application, like VoIP, and as such, the listening intervals 310 may be relatively short (e.g., two frames or 10 milliseconds long) and periodic. In contrast, the PSC 1 may be associated with a non-real-time application, like FTP, and the listening intervals 320 may not be as periodic as the listening intervals 310 and may be longer to accommodate the incoming data. As can be seen, the transceiver 118 of the MS 112 (see FIG. 1) may be in an awake state for a relatively lengthy amount of time, as it must accommodate the listening intervals 310, 320 of both PSC 1 and PSC 2.

Referring to FIG. 4, an example of a consolidated PSC is shown. To describe FIG. 4, reference will also be made to FIG. 1. In one arrangement, when the MS 112 is supporting multiple application connections, the identifier 122 can identify a primary application connection and can define a consolidated PSC based on a demand property of the primary application connection. For example, the MS 112 may be currently and simultaneously supporting VoIP (real-time) and FTP (non-real-time) application connections. The identifier 122 can select one of the application connections as the primary application connection for purposes of defining the consolidated PSC.

In one arrangement, the selected application connection can be a connection that is deemed the most important of the current application connections or at least exists in a most critical category of application connections. In particular, the selected application connection can be the application connection that is more sensitive to time delays compared to the other application connections, i.e., it can be substantially periodic in nature. For example, the real-time application connections, such as those associated with the exchange of voice, may be considered the most important or critical application connections. In this example, between the VoIP and FTP connections, the identifier 122 may select the application connection associated with the VoIP application to create the consolidated PSC (PSC 1) based on the demand properties of the VoIP application connection. In this case, the demand properties of the VoIP application connection may include the periodicity or frequency of its listening intervals and the number of frames in the listening interval. Selection of this PSC as the consolidated PSC can ensure that the MS 112 may maintain its listening schedule for such a critical application. The FTP connection is not as delay-sensitive, because it is a non-real-time application.

Once PSC 1 has been selected, the consolidation unit 124 can consolidate other application connections with PSC 1, which is shown as the consolidated PSC of FIG. 4. That is, the consolidated PSC has essentially replaced PSC 1 and PSC 2. As a result, both application connections here (VoIP and FTP) can maintain a common listening interval 330 for purposes of listening for transmissions from the BS 110. As reflected by the additional sleep states shown in FIG. 4, this process provides more opportunities for the transceiver 118 to stay in sleep state, which can improve power management of the MS 112. As will be explained below, however, the ability of the MS 112 to properly receive and process incoming traffic is not affected. It must also be noted that that any suitable number of PSCs may be consolidated, as the invention is not limited to any particular number.

Referring back to FIG. 2, at step 214, a deactivation notice can be received from the MS. At step 216, traffic can be transmitted to the MS, and at step 218, the consolidated PSC can be deactivated when a deactivation indicator is received. For example, referring back to FIGS. 1 and 4, following the consolidation step, the MS 112 can signal the BS 110 with a deactivation notice. For example, the MS 112, through a sleep request, can signal the BS 110 about the formation of the consolidated PSC and any methods that may be used to deactivate the consolidated PSC. As such, the BS 110, when it receives the deactivation notice, is aware that the MS 112 has consolidated its PSCs (or is about to consolidate) and may possibly deactivate it upon receipt of traffic from the BS 110. It must be noted that the deactivation notice is not limited to being transmitted from the MS 112 to the BS 110 following the consolidation step described above. In particular, this deactivation notice may be transmitted from the MS 112 to the BS 110 when the consolidated PSC is first defined.

Eventually, during one of the listening intervals 330, the BS 110 may transmit traffic to the MS 112. This transmitted traffic may serve as a deactivation indicator. For example, a downlink (DL) data packet that is transmitted from the BS 110 may act as a deactivation indicator from the MS 110. This DL data packet can be any suitable type of data, such as a medium access control protocol data unit (MPDU). That is, the MS 112 can be configured such that any type of traffic that is associated with application connections in the consolidated PSC and that is transmitted from the BS 110 can serve as a deactivation indicator. Of course, the invention is not so limited, as the MS 112 can be designed to distinguish between certain types of traffic such that only a particular form of incoming traffic may act as a deactivation indicator.

Once it receives the deactivation indicator, the consolidation unit 124 of the MS 112 can deactivate the consolidated PSC. For example, the second listening interval 330 of FIG. 4 shows the deactivation of the consolidated PSC. In particular, the consolidated PSC that was defined by, for example, the most important application connection, can be temporarily suspended. In this case, the BS 110 may have continuously transmitted to the MS 112 traffic relating to, as an example, the FTP application or any other application connection associated with the consolidated PSC. In response, the MS 112 can maintain the listening interval 330 to accommodate the traffic exchange. This process is reflected by the additional length of the second listening interval 330. As such, the consolidated PSC can be deactivated for the duration of the traffic exchange, which, in this example, is the time it takes to receive the FTP downlink data or possibly downlink data of all application connections of the consolidated PSC. It must be noted, however, that the invention is not so limited, as the consolidated PSC can be deactivated for any suitable amount of time.

Referring once again to FIG. 2, at step 220, a reactivation indicator that, when received by the MS, will cause the MS to reactivate the consolidated PSC can be embedded in the transmitted traffic. In addition, the reactivation indicator that prompts the reactivation of the consolidated PSC can be received, as shown at step 222. At step 224, the consolidated PSC can be reactivated.

For example, referring back to FIGS. 1 and 4, because it is aware that the MS 112 has consolidated its PSCs, the BS 110 can embed or insert in traffic transmitted to the MS 112 a reactivation indicator. As noted above, the reactivation indicator can cause the consolidation unit 124 of the MS 112 to reactivate the consolidated PSC that is associated with the multiple application connections. For example, the processor 114 of the BS 110 can generate a DL data packet that indicates the end of a traffic exchange, such as a DL sleep control extended sub-header, which can be present in the payload of a DL MPDU to be sent to the MS 112. This sub-header can identify the end of the transmission coming from the BS 110. In another arrangement, the BS 110 may transmit an unsolicited sleep response message to cause the MS 112 to reactivate the consolidated PSC. It must be noted that the invention contemplates other ways to provide notice to the MS 112 that a particular traffic exchange is coming to or has come to an end for purposes of reactivating a deactivated consolidated PSC.

The MS 112 can receive the reactivation indicator, and the consolidation unit 124 can cause the consolidated PSC to be reactivated. In other words, the listening intervals 330 and sleep states that were associated with the consolidated PSC can be resumed. For example, focusing on the second listening interval 330 of FIG. 4, that listening interval 330, because the traffic exchange is completed, can end, and the MS 112 can once again enter a sleep state. In fact, in one arrangement, the MS 112 can enter the sleep state at a frame immediately following the frame containing the reactivation indicator. As a result, the MS 112 can have an opportunity to enter the sleep state prior to the next listening interval 330, as can be seen in FIG. 4. This reactivation process that is described above can avoid a lengthy message exchange that may prevent the MS 112 from entering the sleep state. Moreover, if for any reason the MS 112 does not properly receive the reactivation indicator, the MS 112 can simply remain in an awake state until the next listening interval 330.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for consolidating power saving classes, comprising:
in a mixed media environment having a plurality of application connections associated with different power saving classes, identifying a primary application connection;
defining a consolidated power saving class based on a demand property of the primary application connection; and
consolidating at least some of the remaining application connections with the consolidated power saving class such that the consolidated power saving class is associated with multiple application connections.

2. The method according to claim 1, further comprising deactivating the consolidated power saving class when a deactivation indicator is received.

3. The method according to claim 2, wherein the deactivation indicator is a downlink data packet.

4. The method according to claim 2, wherein the consolidated power saving class is deactivated for the duration of a traffic exchange.

5. The method according to claim 2, further comprising reactivating the consolidated power saving class.

6. The method according to claim 5, further comprising receiving a reactivation indicator that prompts the reactivation of the consolidated power saving class.

7. The method according to claim 6, wherein the reactivation indicator is a downlink data packet or an unsolicited sleep response that indicates the end of a traffic exchange.

8. The method according to claim 1, wherein the primary application connection is a substantially periodic application connection and is part of a most critical application connection category.

9. The method according to claim 8, wherein the primary application is a real-time application connection.

10. A method of facilitating the generation of a consolidated power saving class, comprising:
   receiving from a mobile station a deactivation notice;
   transmitting traffic to the mobile station; and
   embedding in the transmitted traffic a reactivation indicator that, when received by the mobile station, will cause the mobile station to reactivate a consolidated power saving class associated with multiple application connections.

11. The method according to claim 10, wherein the reactivation indicator is a downlink data packet or an unsolicited sleep response that indicates the end of a traffic exchange.

* * * * *